May 28, 1968   P. A. MADSEN   3,385,257
SIGNALLING DEVICE FOR MOBILE TANK VEHICLE
Filed Feb. 1, 1966   2 Sheets-Sheet 1
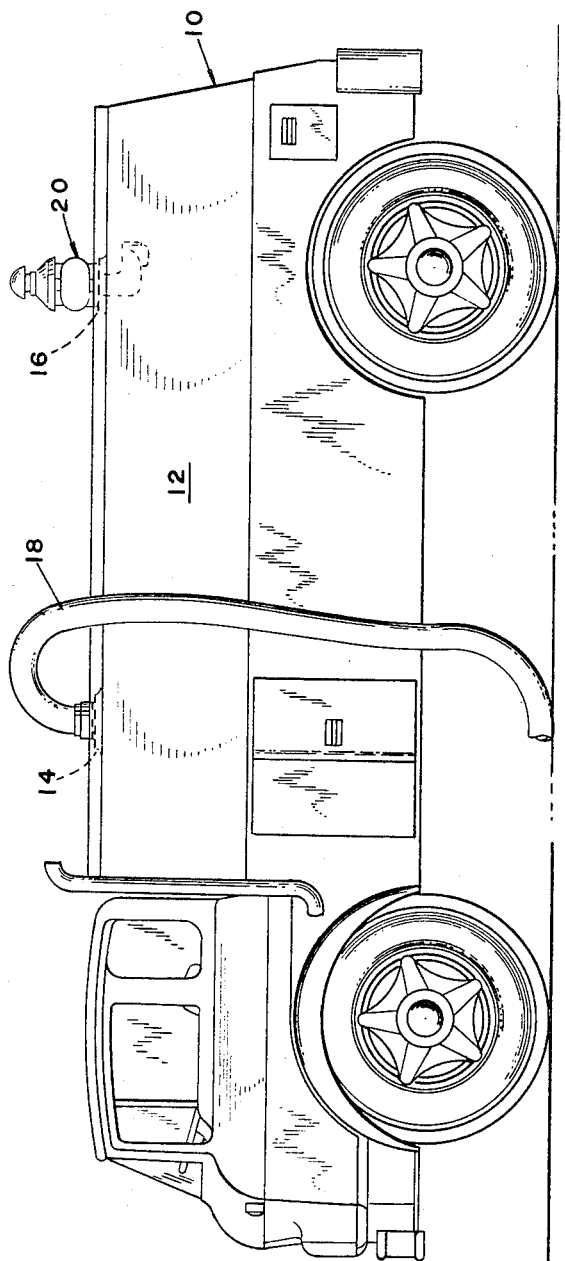
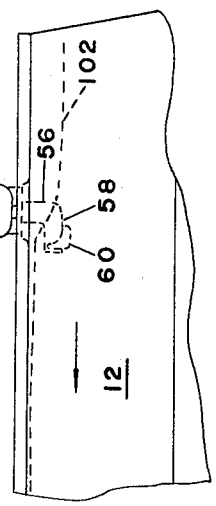
INVENTOR
PETER A. MADSEN
BY
ATTORNEY

INVENTOR
PETER A. MADSEN
BY
ATTORNEY

United States Patent Office 3,385,257
Patented May 28, 1968

3,385,257
SIGNALLING DEVICE FOR MOBILE
TANK VEHICLE
Peter A. Madsen, Tartan Road, Richboro, Pa. 18954
Filed Feb. 1, 1966, Ser. No. 524,108
10 Claims. (Cl. 116—109)

This invention relates to a signalling device for a mobile tank vehicle, such as a conventional tank truck for hauling fluids of different kinds with which the tank of the vehicle is to be filled. More particularly, the invention pertains to a whistle-type signal arranged to be mounted on one of the ports or domes placed at spaced locations along the top of the tank of a tank truck or the like. Filling of the tank takes place through one of said ports or domes, while air escapes from the interior of the tank through the port or dome to which the signalling device embodying the principles of the present invention is connected. The whistle of said signalling means is actuated by said escaping air.

The use of signalling devices, including air-operated whistles, is old for purposes of indicating when tanks, such as fuel tanks for oil furnaces, gasoline tanks of vehicles, and the like, as well as other types of tanks, are being filled with liquid so as to indicate to the operator when the tank is nearly filled and thereby prevent overflowing the tank or the fill pipe.

Particularly in regard to the tanks of tank trucks of large capacity, as when the trucks are moving, and especially if the entire tank or the various compartments thereof are nearly full, acceleration and deceleration of the truck will cause a surging of the liquid within the tank or compartments therein. If said tank or one of said compartments has a signalling device of the air-operated whistle type mounted on the top thereof, the surging of liquid in the tank can result in at least some of the liquid being forced up through the whistle and escaping from the tank, thereby causing waste and also constituting a potential hazard from fire, especially if the liquid is of the flammable type.

Further, when tank trucks which have tanks or compartments that are nearly full move over uneven ground, and especially when the trucks tend to tilt from side to side, discharge of liquid from the tanks can occur through such whistle-signal means, resulting in waste as well as creating a potential fire hazard for the reasons referred to above.

It is the principal object of the present invention to provide a relatively simple air-operated whistle signal mechanism arranged to be mounted within one of the ports or domes in the top of a tank of a mobile tank vehicle and preferably capable of being permanently carried by the tank during transportation of liquid in the tank but including means automatically operable to prevent the escape of liquid from the tank either during surging of the liquid within the tank or when the tank tilts sufficiently from side to side so as otherwise to permit or cause the escape of liquid from the tank through said signal means, thereby not only preventing waste of the liquid being transported by the vehicle, but also preventing the same constituting a fire hazard in the event the liquid is of the flammable type.

Another object of the invention is to provide signal means of the type referred to with a depending air tube terminating in a substantially horizontal extension, the air tube being swiveled for movement about a substantially vertical axis with respect to the main body of the signal unit, and a vane is provided on the horizontally extending lower extremity so that upon the occurrence of surging of liquid in the tank, the lower extension of said tube, due to the action of liquid engaging the vane thereon, will cause the open terminal end of the extension to extend in trailing direction, downstream with respect to the surging liquid, thereby minimizing or substantially preventing the movement of liquid up the tube for possible escape through the whistle means of the signal unit.

It is a further object of the invention to provide signal means of the type referred to with a valve capable of being operated, preferably by gravity means, in the event the vehicle and the tank thereon tend to tilt toward one side or the other and thereby prevent the escape of liquid through said whistle means of the signal unit, notwithstanding the fact that the tank or any individual compartment to which the signal unit is attached may be substantially full and otherwise would result in possibly substantial quantities of the liquid escaping through the whistle opening.

Still another object of the invention ancillary to the immediately preceding object is the provision of means to insure opening of the valve following the closing thereof by the gravity-means when the vehicle and tank are restored substantially to horizontal position, said means also being useful to prevent movement of the valve to closed position incident to the rushing of escaping air therethrough as, for example, when the filling of the tank is occurring at a relatively fast rate.

Details of the foregoing objects, as well as details of the invention, and other objects thereof, are set forth in the following specification and illustrated in the accompanying drawings comprising a part thereof.

In the drawings:

FIG. 1 is a side elevation of an exemplary mobile tank vehicle, such as a tank truck, showing an exemplary filling hose being connected to one of the ports on top of the tank, while signal means embodying the principles of the present invention is connected to another longitudinally spaced port or dome on the top of the tank.

FIG. 2 is a fragmentary side elevation of a portion of the tank and signal unit illustrated in FIG. 1 and showing, in exemplary manner, the tank containing a relatively high level of liquid therein moving in surging manner and in which the lower extremity of the air inlet tube of the signal unit is submerged in trailing direction.

Figure 3:
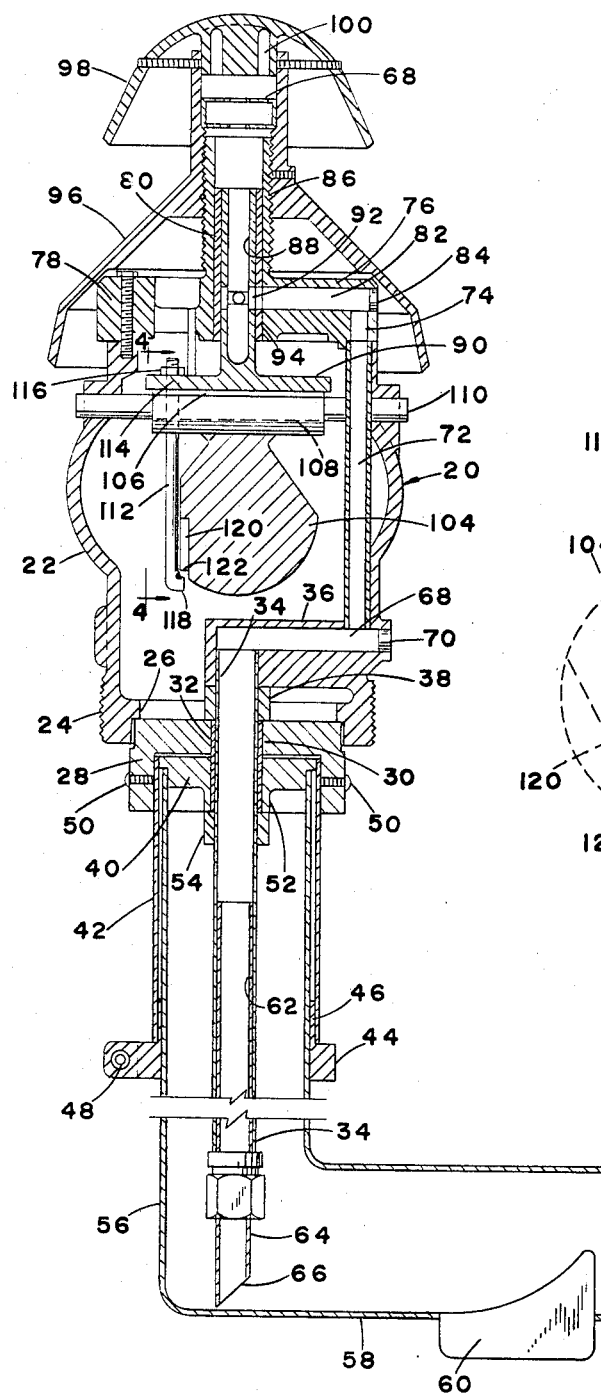
FIG. 3 is an enlarged vertical sectional view of the signalling unit illustrated in FIGS. 1 and 2 and showing details of the same which comprise the novel aspects of the present invention.

Referring to FIG. 1, a conventional, exemplary mobile tank vehicle 10, commonly referred to as a tank truck, is illustrated. The tank 12 thereof may contain only a single cavity, or a plurality of cavities or compartments, as desired. For purposes of illustrating the present invention, however, it is assumed that the tank 12 has only a single compartment therein.

The tank illustrated in FIG. 1 normally is provided with a plurality of ports or domes 14 and 16 in the top thereof, at longitudinally spaced locations. Normally, the tank is emptied of its liquid content by discharge ports, not shown, in the bottom of the tank, while the ports 14 and 16 are used for filling operations.

To illustrate the principles of the invention, the port 14 has been selected for exemplary connection thereto of a filling hose or conduit 18 to effect filling of the tank 12 with any desired liquid such as fuel oil, gasoline, or the like. Under some circumstances, such filling occurs through an appropriate meter and, the capacity of the tank 12 being known, the operator is able to judge with reasonable accuracy when the tank is nearly full. However, such operation presupposes that the tank is empty when filling commences and this is not always a fact. It is also customary to fill the tanks of tank trucks by either pumping liquid into the tank or discharging the same thereinto by gravity means and as the tank fills, air originally contained therein is discharged. This is effected by opening the port 16, for example. It also will be understood that the ports normally are provided with readily removable closure members, not shown.

In accordance with the present invention, the discharge of air from the tank during the filling operation occurs through port 16 and the invention contemplates the use of an air-operated signal unit 20 which is connected to port 16, preferably, permanently so as not only to serve as a signal means but also a closure. To provide suitable appreciation of the unit 20, the size thereof is somewhat exaggerated in FIGS. 1 and 2 in proportion to the size of the tank 12 but the invention does not restrict the unit 20 to being of any particular size.

Referring to FIG. 3, wherein various components of the signal unit 20 are shown in detail, it will be seen that such unit comprises a body 22 having a threaded extremity 24 thereon which engages suitable threads in the collar of the port 16 for effective connection of the body 22 to said collar. This arrangement provides a supporting means for the signal unit 20 with respect to tank 12.

The threaded extremity 24 has a central opening 26 which communicates with the interior of the hollow body 22 and rotatably receives a swivel housing 28. Said housing has a central bore 30 which contains a bushing 32 that is rotatable about a fixed bearing sleeve 34 carried by and extending downward from the inner end of a lateral extension 36 fixed to the inner wall of body 22.

Mounted on the upper portion of bearing sleeve 34 immediately above the swivel housing 28 is a spacing member 38 which, for convenience, preferably is of a self-lubricating synthetic resin such as "Teflon," or the like. Also, the swivel housing 28 is provided in its lower surface with a cylindrical cavity which receives a plug 40 that is complementary in shape to said cavity. The perimeter of plug 40 is slightly spaced from the inner wall of the cylindrical cavity in housing 28, said space receiving the upper end of an exterior tube 42, into the lower end of which a clamping collar 44 is fitted fixedly. As will be seen from FIG. 3, the collar 44 has a thin walled annular projection 46 extending upward into the lower end of the exterior tube 42 a short distance and being fixedly connected thereto by any suitable means, such as soldering or the like. The clamping collar 44 is split and a clamping screw 48 extends through the ends formed by the slit therein, for purposes to be described.

The upper end of exterior tube 42 is closely positioned between the perimeter of plug 40 and the inner wall of the cavity in swivel housing 28, these elements being detachably connected together by appropriate screws 50 arranged at circumferentially spaced location. Plug 40 also has an annular extension 52, the lower end of which rotatably engages a combination locking collar and bearing 54 which, preferably, is made from material similar to that from which spacing member 38 is formed so as to be self-lubricating. Thus, it constitutes the lower thrust bearing for rotatably supporting the assembled swivel housing 28 and all of the elements connected thereto including the exterior tube 42 and plug 40. It is to be understood also that there is reasonable clearance between the perimeter of the upper end of swivel housing 28 and the central opening 26 of body 22 within which the upper end of the housing 28 is disposed.

The exterior of tube 42 receives the upper end of a vertical air inlet tube 56 which, in FIG. 3, is broken intermediately of the ends thereof to indicate a foreshortening of the tube, it being understood that said tube may be any suitable length, depending upon the size of the tank with which the signal unit is used and the degree of filling which is desired before the signal unit is to indicate that further filling is to cease.

The air inlet tube 56 terminates at its lower end in a substantially horizontal extension 58. Adjacent the outer discharge end of extension 58 is a vane 60 which extends longitudinally along the lower surface of the extension and functions somewhat as a rudder. The upper end of air inlet tube 56 is received within and is vertically adjustable with respect to the exterior tube 42, the adjusted position being maintained by the clamping collar 48 which is tightened around the intermediate portion of tube 56 when desired vertical position is effected.

The bearing sleeve 34 preferably depends a substantial distance within the tube 56 and is coaxial therewith. Extending telescopically upward within the lower end of the bearing sleeve 34 is a vertically adjustable extension tube 62, the same having a discharge tip 64 fixed to the lower end thereof and terminating in a diagonal extremity so as to provide an air inlet 66 which cannot be closed due to engagement of the lower wall of the horizontal extension 58 of tube 56 therewith. Also, if desired, the extension tube 62 may be rotatable about its axis within the relatively fixed bearing sleeve 34, under which circumstances the extension tube 62 is free to rotate either directly or otherwise with the tube 56 when it swivels about its axis.

The swiveling arrangement of the air inlet tube 56, together with its exterior tube 42 and swivel housing 28 about the vertical axis of the entire signal unit comprises one of the important improvements afforded by the present invention in view of the fact that the air inlet tube 56, in conjunction with the interior bearing sleeve 34 and its vertically adjustable extension 62, constitute the means by which air exhausting from the tank 12, while being filled, moves upwardly through the body 22 of the unit and discharges through the whistle 68 in the upper portion of the unit. The whistle will continue to be blown by such discharging air until the liquid with which the tank is being filled reaches and completely submerges the horizontal extension 58, whereupon the whistle will cease to blow and the operator knows that the tank is nearly full. Usually filling continues for a few minutes longer, limited by the judgment of the operator from past experience.

Air moving upward through the interior passage means comprising sleeve 34 and extension tube 62 is conducted through a horizontal passage 68 drilled within the lateral extension 36 and closed by a plug 70 at its outer end. The passage 68 communicates with an interior vertical tube 72 which communicates at its upper end with a vertical bore 74 formed in one leg 76 of a spider 78. An exteriorly threaded tubular extension 80 is preferably integral with and extends upward from the central portion of spider 78. Said leg 76 of the spider is drilled longitudinally to provide a horizontal passage 82 having a plug 84 in the outer end thereof and the opposite end communicates with a central cylindrical bore 86 within which a valve sleeve 88 slidably reciprocates.

The lower end of the valve sleeve 88 is fixed to an actuating disc 90 and intermediately of the ends of the valve sleeve 88, a series of drilled ports 92 are provided. If desired, the cylindrical bore 86 may be formed in a bushing 94 fixed coaxially within the tubular extension 80.

From the foregoing construction, it will be seen that as the valve member comprising sleeve 88 moves vertically upward from the position thereof shown in FIG. 3, the port 92 therein which is shown in communication with the passage 82 will move upwardly out of communication with said passage and thereby function as a valve, the valve then being closed against the passage of air when said movable valve sleeve 88 moves upwardly sufficiently to completely remove the port 92 from communication with the inner end of passage 82, thereby discontinuing the passage of air through the whistle 68.

Adjustably and remoably mounted on the threaded exterior of tubular extension 80, which is fixed relative to body 22 by virtue of the spider 78 being screwed to the upper end of body 22, as clearly shown in FIG. 3, is a conical shield 96 which serves as an appropriate guard against weather at the upper end of body 22. Fixed to the upper end of shield 96 is an upper terminal cap 98 which encloses the whistle but air passing through the whistle discharges through appropriate ports 100 in the mounting means for the terminal cap 98.

Under the circumstances where the tank 12 has been substantially filled, as shown in exemplary manner by the phantom upper-level line 102 in FIG. 2, and wherein it will be seen that the lower end of air inlet tube 56 and its horizontal extension 58 are submerged within the liquid, when the vehicle is moving forwardly in the direction of the exemplary arrow shown in FIG. 2 and the brakes are applied, there is a natural tendency for the fluid to surge as indicated by the exemplary phantom line 102. Under such circumstances, the surging will react relative to the vane or rudder 60 to immediately cause the air inlet tube 56 to swivel about its vertical axis and dispose the horizontal extension 58 thereof in trailing, or downstream position with respect to the surging movement of the liquid. Hence, this arrangement provides a safety means to prevent the inlet of liquid into the lower end of the air inlet tube 56. Indeed, on the contrary, there will be a tendency to cause suction from the lower end of said tube, thereby preventing the accidental escape of liquid through the air passage means of the signal unit 20 described in detail above.

Further, when the vehicle accelerates or possibly upon return of the exemplary surge shown in FIG. 2, when moving in the opposite direction, such reverse movement of the fluid will cause the air-inlet tube 56 to swivel approximately 180°, easily and quickly, about its vertical axis, so that the exit end of the tube again assumes a trailing position with respect to the fluid moving past the same, such swiveling continuing until the fluid reaches a substantially quiescent condition.

The foregoing arrangement provides means to prevent accidental discharge of fluid through the air-passage means of the signal unit as a result of surging of the liquid in the tank of the vehicle. Under circumstances, however, where the vehicle and tank tend to tilt, especially to a substantial degree as sometimes occurs due to the crown of roads, parking under certain adverse conditions to effect delivery of the contents of the tank, or otherwise, and because of which conditions the vehicle and tank tend to tilt sidewise, the present invention also provides means for closing the air-control valve which principally comprises movable valve sleeve 88, such closing being effected by elevating the discharge ports 92 of said valve sleeve out of registry with the horizontal passage 82.

Such elevation of the valve sleeve 88 to closed position is very simply but effectively caused by means of a gravity-actuated or gravity-responsive mechanism comprising a pendulum-type weight 104 which, at its upper end, is provided with a disc-like head 106 having a horizontal bearing bore 108 extending therethrough which receives a fixed bearing rod 110 that extends transversely and preferably diametrically across the upper end of hollow body 22 of the unit 20.

Figure 4:
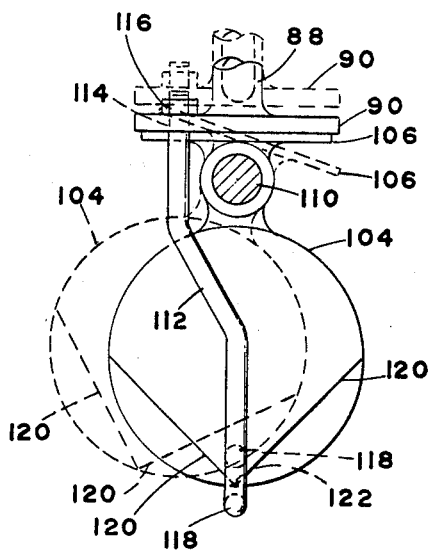
FIG. 4 is a fragmentary, further enlarged side elevation of certain details of the mechanism shown in FIG. 3, as seen on the line 4—4 of said figure, one position of the detailed structure being illustrated in full lines, while, in phantom, an alternate position is illustrated as when the vehicle and tank are tilted transversely and the valve of the signal unit is closed.

The disc-like head 106 of weight 104 preferably is coaxial with the actuating disc 90 of valve sleeve 88 and, as readily can be seen from FIG. 4, when the weight 104 is substantially exactly vertical, as when the vehicle and the tank 12 are substantially horizontal at least in a transverse direction, the upper surface of head 106 will be substantially in completely flat engagement with the lower surface of actuating disc 90. However, upon the vehicle and tank tilting laterally, sidewise, especially to a substantial degree, the weight 104 will tilt to the phantom, exemplary and somewhat exaggerated position shown in FIG. 4, thereby likewise causing similar tilting of the head 106 and thereby elevating the actuating disc 90 and valve sleeve 88, either to substantially or actually completely close the valve. Under such circumstances, if the tank is substantially filled with liquid, none of it will escape by flowing up the air-passage means toward the whistle 68 due to the fact that the valve is closed.

Though the valve member 88 would normally be restored to open position by gravity after the vehicle and tank have resumed substantially level condition, following a tilting thereof, the present invention provides means to insure that said valve will be restored to is normal, open position. The preferred mechanism by which such restoration to open condition is assured comprises combination actuating and restraining means exemplified by rod 112, the upper end of which is offset, as clearly shown in FIG. 4, laterally to one side and extends through a suitable aperture 114 in the actuating disc 90 of valve sleeve 88.

Preferably, the offset upper end of rod 112 is vertically adjustable with respect to the aperture 114 and is maintained in desired adjusted position by nut 116 which may be in the form of a lock nut. The lateral offset of the upper end of rod 112 permits the lower end thereof to be disposed, dependingly, directly below the axis of bearing rod 110 as also shown in FIG. 4, whereby the lower end of rod 112, which terminates in a short lateral extension 118, may be utilized to effect assured restoration of the valve sleeve 88 to its lower, open position.

Such restoration occurs by means of a pair of angularly related cam surfaces 120 which are formed by suitably machining away part of one side of weight 104, as can be clearly seen from FIGS. 3 and 4. The lower ends of said cam surfaces 120 meet at an apex 122, for purposes to be described.

Referring to FIG. 4, it will be seen that when the weight 104 has been swung laterally about the bearing rod 110, such as to the exemplary phantom line position shown in FIG. 4, the lateral extension 118 will be elevated similarly to the rod 112. Upon the weight 104 pivotally restoring itself to the full line position thereof, it will be seen that the right-hand cam surface 120 will engage the lateral extension 118 of rod 112 and force the same downwardly, in the event gravity has not already moved the valve sleeve 88 to or toward its open position.

When, however, the weight 104 is in its normal, full line, depending position and the valve sleeve 88 is in fully open position, the apex 122 of the cam surfaces 120 will not interfere with the lateral extension 118. However, said extension nevertheless, as can be seen from FIG. 3, underlies the apex 122. Hence, under conditions where, for example, the tank 12 is being filled at a fast rate, and particularly if the combined air-passage means through the unit 20 may not be of such capacity as to freely pass the air to atmosphere commensurate with such filling rate, there may be a tendency for the rushing, exhausting air, as it moves through the interior of valve sleeve 88 to tend to raise said valve and, in doing so, will result in the valve moving toward or to closed position. However, this is not possible as long as the vehicle and the tank 12 are disposed substantially horizontally because upon any tendency of the valve sleeve 88 to rise above its open position, the lateral extension 118 will engage the apex 122 of the cam surfaces 120 and thereby restrain any such movement of the valve sleeve 88 toward its closed position.

While the invention has been illustrated and described in its several preferred embodiments, it should be understood that the invention is not to be limited to the precise details herein illustrated and described since the same may be carried out in other ways falling within the scope of the invention as claimed.

I claim:

1. A signalling device for a mobile tank vehicle to indicate automatically during filling operations when the tank on said vehicle is nearly full, said signalling device comprising in combination, a body connectable to a port in the top of the tank of said vehicle and communicating with the interior of said tank, an air inlet tube depending from and swively supported at its upper end by said body for rotation about a substantially vertical axis and terminating at its lower end in an extension extending substantially horizontally in use, vane means on said extension parallel to the axis of said extension, an air-operated whistle supported by the upper portion of said body exteriorly of said tank, and air passage means extending from between said air inlet tube and said whistle by air exhausting from said tank while being filled with liquid until said extension on said inlet tube is covered with liquid so as to close the same to further passage of air, said vane on said extension causing said extension to be disposed in trailing direction during the surging of liquid in said tank as when said vehicle is acceleratng or decelerating, thereby to minimize the passage of liquid from said tank upwardly through said whistle during such surging.

2. The signalling device set forth in claim 1 further including an extension on said air passage means extending downward into said air inlet tube and having an inlet end in the lower portion of said tube to receive air from the horizontal extension of said tube.

3. The signalling device set forth in claim 1 further including means supporting said air inlet tube for limited vertical adjustment relative to said body to permit vertical adjustment of the lower end of said tube at a desired predetermined level below the top of said tank to control the extent to which said tank may be filled before said signal indicates that filling should be stopped.

4. The signalling device according to claim 1 further including valve means in said air passage means, and actuating means engageable with said valve means and operable to close the same when said vehicle is tilted a predetermined amount.

5. The signalling device according to claim 4 in which said actuating means is movable in response to gravity.

6. The signalling device according to claim 4 in which said actuating means is a weight pivotally supported in said body.

7. The signalling device according to claim 6 in which said weight is suspended below said valve means and said valve means includes a movable valve member supported for vertical slidable movement.

8. The signalling device according to claim 7 further including restraining means connected to said movable valve member and engageable with means on said weight to prevent movement of said valve member to closed position by the rushing movement of exhausting air therethrough.

9. The signalling device according to claim 4 in which said valve means includes a vertically movable valve member, and said signalling device also including means operable to prevent the movement of said valve member to closed position by exhausting air moving therethrough.

10. The signalling device according to claim 6 further including a movable valve member and restraining means connected to said valve member, and means on said weight engageable with said restraining means to insure return of said valve member to open position following the closing of said valve by tilting of said vehicle and restoration of said vehicle substantially to level condition.

References Cited
UNITED STATES PATENTS

| | | | |
|---|---|---|---|
| 56,004 | 7/1866 | Capewell | 222—376 XR |
| 194,126 | 8/1877 | Cabell | 116—108 |
| 1,188,248 | 6/1916 | Clarke | 116—118 XR |
| 2,020,593 | 11/1935 | Wattells | 116—118 |
| 2,093,144 | 9/1937 | Brunell | 137—139 |
| 2,556,180 | 6/1951 | Hamilton et al. | 222—376 XR |
| 2,746,415 | 5/1956 | Campbell | 116—109 |
| 2,756,715 | 7/1956 | Harks | 116—118 |

LOUIS J. CAPOZI, *Primary Examiner.*